United States Patent
Nakamoto et al.

(10) Patent No.: US 7,304,292 B2
(45) Date of Patent: Dec. 4, 2007

(54) DISPLACEMENT SENSOR HAVING A PHASE VARIATION OF AN IMPEDANCE

(75) Inventors: Tsuyoshi Nakamoto, Tokyo (JP); Norihisa Shibayama, Tokyo (JP); Masakazu Matsui, Tokyo (JP); Kazuhiko Matsuzaki, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 301 days.

(21) Appl. No.: 11/188,602

(22) Filed: Jul. 25, 2005

(65) Prior Publication Data

US 2006/0022125 A1 Feb. 2, 2006

Related U.S. Application Data

(60) Provisional application No. 60/591,424, filed on Jul. 27, 2004.

(51) Int. Cl.
*H01J 40/14* (2006.01)
(52) U.S. Cl. .................................. 250/221; 250/214 R
(58) Field of Classification Search ................ 250/221, 250/214 R, 214.1; 324/230, 202, 207.26, 324/207.2; 356/506, 519
See application file for complete search history.

(56) References Cited

U.S. PATENT DOCUMENTS 4,006,637 A * 2/1977 Kinosita ..................... 73/313

FOREIGN PATENT DOCUMENTS

JP 2000-292201 10/2000

* cited by examiner

*Primary Examiner*—Que T Le
(74) *Attorney, Agent, or Firm*—Cantor Colburn LLP (57) ABSTRACT

A displacement sensor comprising: a detecting portion including a coil arranged in such manner that a relative position to a magnetic response substance varies in correspondence to a displacement of an object to be measured; an oscillating circuit to supply an alternating-current signal with a prescribed frequency to the detecting portion; an externally attached circuit connected to the detecting portion; and a displacement detecting means to detect the displacement of the object to be measured based on an amount of phase variation of an impedance in the detecting portion and the externally attached circuit, wherein parameters of the externally attached circuit are set in such manner that the amount of the phase variation by the displacement becomes larger than the amount of the phase variation by temperature variation.

5 Claims, 12 Drawing Sheets

DISPLACEMENT SENSOR HAVING A PHASE VARIATION OF AN IMPEDANCE

CROSS-REFERENCE TO RELATED APPLICATION

The present application claims the benefit of the date of the earlier filed provisional application, having U.S. Provisional Application No. 60/591,424, filed on Jul. 27, 2004, which is incorporated herein in its entirety.

FIELD OF THE INVENTION

The present invention relates to a displacement sensor to detect a displacement of an object to be measured, and in particular, an electromagnetic induction type displacement sensor in which the displacement can be detected based on a relative position between a coil excited by an alternating current and a magnetic response material such as magnetic substance or the like.

RELATED ART

Conventionally, a displacement sensor to detect the displacement of the object to be measured is widely used in various fields. There is proposed variety of detecting types as the displacement sensor as described above. Among them, an electromagnetic induction type displacement sensor is well known as an excellent type in reliability, simplicity and expediency (for example, refer to Japanese Patent application publication 2000-292201). In the electromagnetic induction type displacement sensor, the displacement is detected based on a relative position between a coil excited by an alternating current and a magnetic response material such as magnetic substance or electric conductor. Thus, non-contact detecting portion is used so that the reliability thereof is improved. For example, the relative position between the coil and the magnetic response material can be detected based on the variation of the impedance in the detecting portion of the electromagnetic induction type displacement sensor.

Since the displacement sensor is used under various conditions, it is desirable that the sensor has a property stable to a temperature variation. However, the coil applied in the displacement sensor practically has a large temperature dependency due to the temperature property in the resistance of the winding, and the temperature variation of the inductance in accordance with the deformation of the shape of the coil. The above-mentioned temperature dependency is hardly removed even if the material of the coil and the shape thereof are optimized. Accordingly, it is desirable that the temperature dependency of the coil may be compensated in any way.

There is proposed a method of compensating the temperature dependency in the displacement sensor, for example, a method of using a pair of coils which have properties contradicting each other in the variation of the inductance according to the displacement. The difference between two output is obtained to offset the portions of the temperature variation, thus compensating the temperature dependency. However, according to the above-mentioned method, since the precise symmetric structure is required in the pair of coils to have properties contradicting each other, the coils and other components in the structure have to be manufactured to satisfy highly preciseness. Accordingly, the manufacturing cost thereof may become high and mass production is not appropriate for those components.

In addition, there is proposed another method of compensating the temperature dependency in the displacement sensor in which an amount of the variation in the output of the sensor to an environmental temperature is stored in a storage medium in advance, and a signal processing is implemented using the data stored in the storage medium to compensate the temperature dependency. However, according to the above-mentioned method, the storage medium has to be installed to store the date, thus the cost thereof becomes high.

SUMMARY OF THE INVENTION

One of the object of the invention is to provide a displacement sensor highly reliable and stable to the temperature variation in which a temperature dependency of the detecting portion including a coil in the displacement sensor is properly compensated by a simple construction and at low cost.

A displacement sensor comprises: a detecting portion including a coil arranged in such manner that a relative position to a magnetic response substance varies in correspondence to a displacement of an object to be measured; an oscillating circuit to supply an alternating-current signal with a prescribed frequency to said detecting portion; an externally attached circuit connected to said detecting portion; and a displacement detecting means to detect said displacement of the object to be measured based on an amount of phase variation of an impedance in said detecting portion and said externally attached circuit, wherein parameters of said externally attached circuit are set in such manner that the amount of the phase variation by the displacement becomes larger than the amount of the phase variation by temperature variation.

According to the above embodiment, an alternative current signal is applied to the detecting portion from an oscillating circuit when the displacement of the object to be measured is detected in the displacement sensor, to varies the phase of the impedance in the detecting portion and the externally attached circuit, thus enabling to detect the displacement. At the same time, the impedance varies by the displacement and the effect of the temperature. Since the externally attached circuit is adjusted in such manner that an amount of the phase variation by the displacement becomes larger than an amount of the phase variation by the temperature variation, the temperature dependency of the displacement sensor is surely compensated. The temperature characteristics of the displacement is maintained stable to improve the reliability by a simple construction and at a low cost.

In the embodiment of the displacement sensor of the invention, the parameters of the externally attached circuit are set to satisfy a following equation:

$$|\phi(x_0, T_1) - \phi(x_0, T_2)| < |\phi(x_1, T_0) - \phi(x_2, T_0)|$$

where $T_0$ is a standard temperature which becomes standard for a temperature, $x_0$ is standard position which becomes standard for a position of said object to be detected, variation region of the temperature is from $T_1$ to $T_2$, variation region of the position is from $x1$ to $x2$, and said phase is expressed by a function $\phi(x, T)$ of the position x and the temperature T.

According to the above embodiment, when the displacement of the object to be measured is detected in the displacement sensor, since the externally attached circuit is adjusted in such manner that an amount of the phase variation by the temperature variation is sufficiently low to be disregarded in comparison with the phase variation by the displacement, the output variation by the temperature can be remarkably reduced, thus enabling to improve the reliability of the displacement sensor.

DETAILED DESCRIPTION OF THE INVENTION

Figure 1:
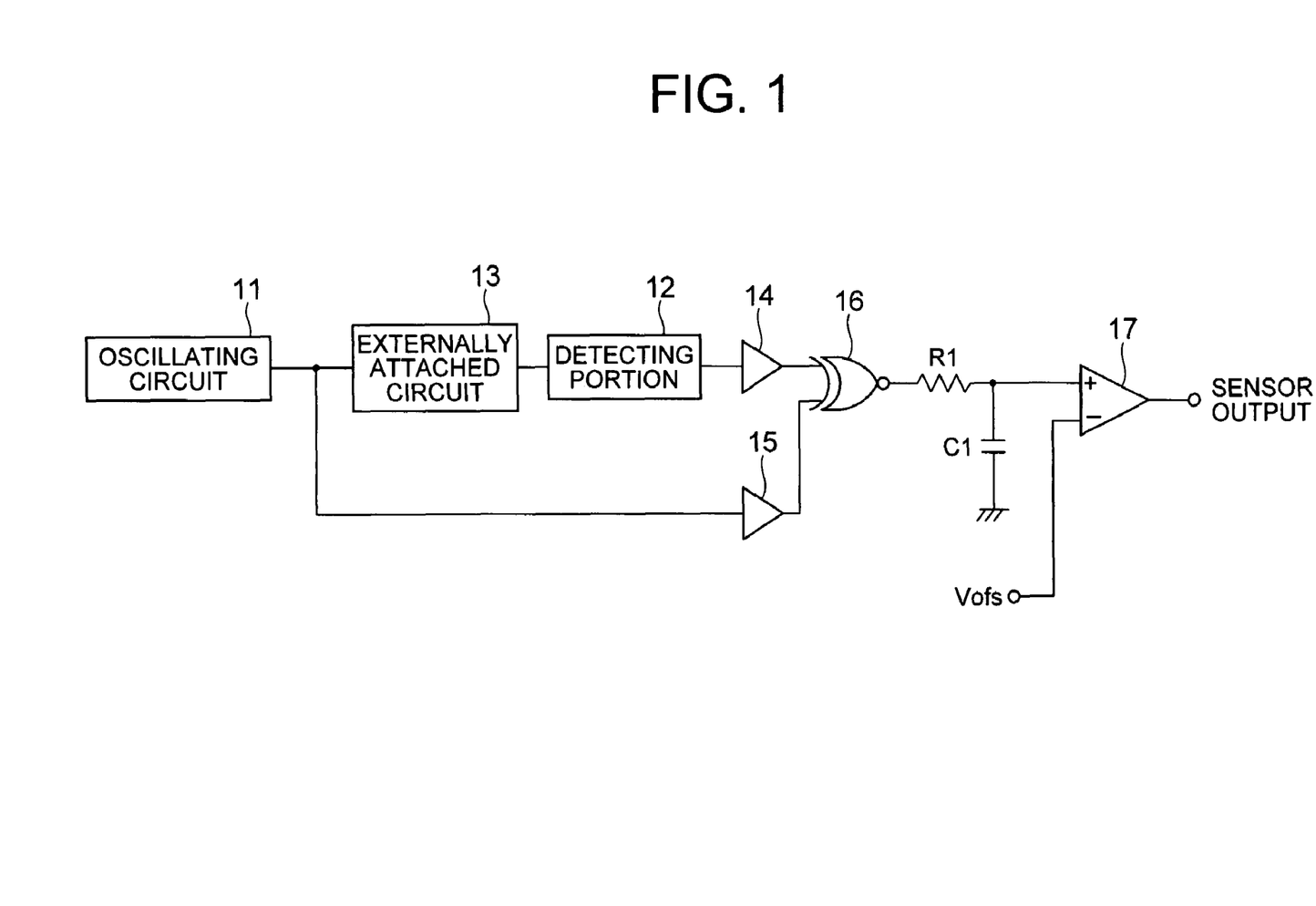
FIG. 1 shows a circuit configuration of the displacement sensor of the present invention.

The displacement sensor of the present invention is explained with reference to the drawings. FIG. 1 shows a circuit configuration of the displacement sensor of the present invention. As shown in FIG. 1, the displacement sensor of the present invention comprises an oscillating circuit 11, a detecting portion 12, an externally attached circuit 13, a buffer amplifier 14, 15, an EXOR(exclusive or) computing element 16, a resister R1, a condenser C1, and an operational amplifier 17.

The oscillating circuit 11 generates an alternating current signal having a prescribed frequency to supply the detecting portion 12 and the buffer amplifier 14. The detecting portion 12 includes a coil in which a relative position between a magnetic substance and a magnetic response substance is designed to vary in correspondence with the displacement of the object to be measured. Furthermore, the coil of the detecting portion 12 is excited by the alternating current signal supplied from the oscillating circuit 11 to flow an alternating current having corresponding amplitude and phase to a series impedance in the detecting portion 12 and the externally attached circuit 13.

Figure 2:
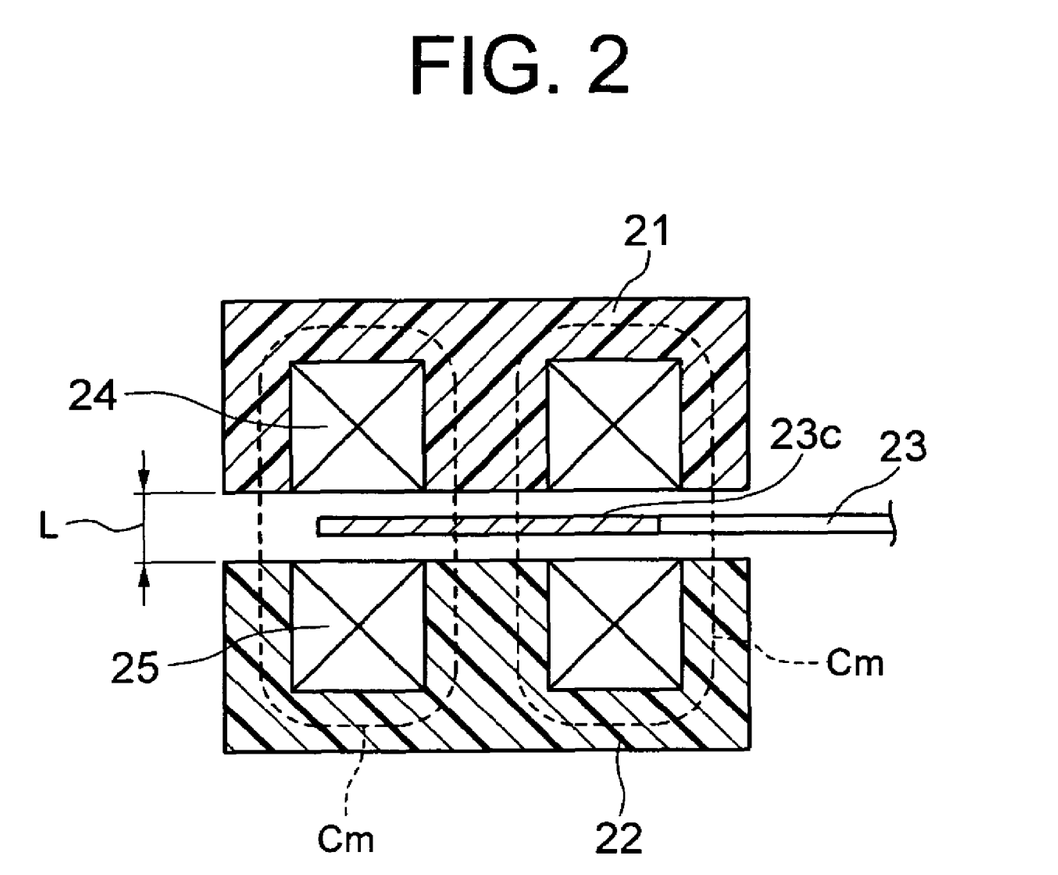
FIG. 2 is a cross sectional view to show an example of the mechanical structure of the periphery of the detecting portion.
Figure 3:
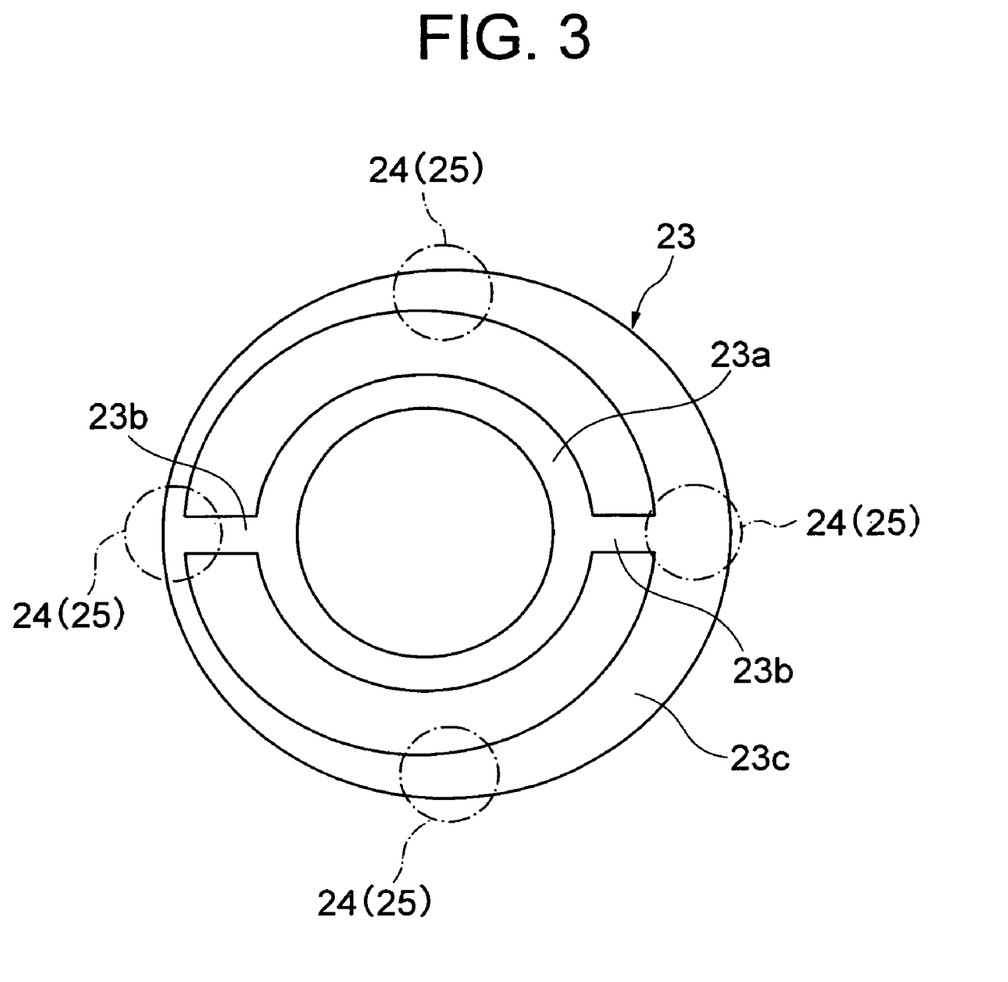
FIG. 3 is an example, i.e., a plan view of the rotor, of the mechanical structure of the periphery of the detecting portion.

FIGS. 2 and 3 show a concrete example of the mechanical structure of the periphery of the detecting portion 12. In this embodiment, the displacement sensor of the invention is used as a rotating sensor. As shown in the cross sectional view of FIG. 2, a rotating sensor as an example of the displacement sensor has the structure in which two fixed cores 21, 22 are arranged face to face with the distance L therebetween, and a rotor 23 of conductive material is placed between the cores.

The core 21 is made of a insulating magnetic material, and an exciting coil 24 is integrally attached to the core 21 while an exiting coil 25 is integrally attached to the other core 22. The exciting coils 24 and 25 are arranged face to face with the rotor 23 interposed therebetween to form a magnetic circuit Cm when the alternating current is applied, as shown in FIG. 2.

Furthermore, as shown in FIG. 3, the rotor 23 is manufactured by stamping a conductive metal (for example, cupper, silver, aluminum, brass or the like) in which a sensing portion 23c is formed through two bridge portions 23b extending outwardly from the outer periphery of an attaching ring 23a. The sensing portion 23c is formed in such manner that the width in the diameter direction varies in corresponding to an angle of rotation of the rotor 23. As shown in FIG. 2, the magnetic circuit Cm is formed so as to cross the sensing portion 23c. When the magnetic flux crosses the sensing portion 23c, eddy current is generated on the surface of the sensing portion 23c. The sensing portion 23 is formed in such manner that the width in the diameter direction varies in correspondence to the angle of rotation of the rotor 23. Accordingly, when the rotor 23 rotates, the area of the sensing portion 23c facing the fixed cores 21, 22 varies to correspondingly vary an amount of the eddy current generated on the surface of the sensing portion 23c. Since the impedance of the exciting coils 24, 25 varies in corresponding to the amount of the eddy current, an angle of rotation of the rotor can be detected according to the detection of the amount of the eddy current. The rotor 23 vibrates between the fixed cores 21, 22, when the rotor vibrates in the rotational axis, to cause the respective distances between the fixed core 21 or the fixed core 22 and the rotor 23 to vary. The directions of the above variations of the distances are opposite. Thus, when the signal processing is implemented so as to offset the variations of the impedance described hereunder in corresponding to the variations of the distances between the rotor and the fixed core 21 or the fixed core 22, the angle of rotation can be detected in highly preciseness.

In the embodiment of the invention, as described later, the displacement of the object to be measured is detected by detecting the variation of the impedance in the detecting portion 12. In FIG. 1, a phase shift is occurred in the alternating current signal output through the externally attached circuit 13 and the detecting portion 12 in correspondence to the variation of the impedance in the detecting portion 12, thus enabling to detect the displacement of the object to be measured based on the above phase shift. The relationship between the phase shift of the alternating current signal and the externally attached circuit 13 as well as the detecting portion 12 is described later in detail.

The alternating current signal outputted through the externally attached circuit 13 and the detecting portion 12 is input into the buffer amplifier 14. On the other hand, the alternating current signal generated in the oscillating circuit 11 is branched into a passage different from the detecting portion 12 and the externally attached circuit 13, and input into the buffer amplifier 15. The input alternating current signal is amplified to a saturated level in the respective buffer amplifiers 14, 15, and transformed into a pulse signal which repeats high level and low level. Thus, alternating current pulse with phase shift is output from the buffer amplifier 14, while alternating current pulse without phase shift is output from the buffer amplifier 15.

Then, the respective alternating current pulses from the buffer amplifier 14, 15 are input into the EXOR computing element 16, and pulse signal obtained in the EXOR computing of two alternating current pulses is output. The pulse signal output from the EXOR computing element 16 has a pulse width in proportional to an amount of the phase shift of the alternating current pulse from the buffer amplifier 14. An integrating circuit comprising a resistor R1 and a condenser C1 at the output side of the EXOR computing element 16. Thus, the pulse signal output from the EXOR computing element 16 is integrated by the time constant decided by the resistance R1 and the condenser C1 to produce an analog signal which varies smoothly. It is necessary that the resister R1 and the condenser C1 are selected so that the time constant becomes sufficiently large, considering the frequency of the alternating current signal in the oscillating circuit.

The operational amplifier 17 amplifies by a prescribed gain the analog signal input from the above-mentioned integrating circuit and output to the outside as a sensor output from the displacement sensor. The above-mentioned analog signal is input at the input terminal of the plus side of the operational amplifier 17, while the offset voltage Vofs is applied to the input terminal of the minus side of the operational amplifier 17 to adjust a direct current voltage level.

Figure 4:
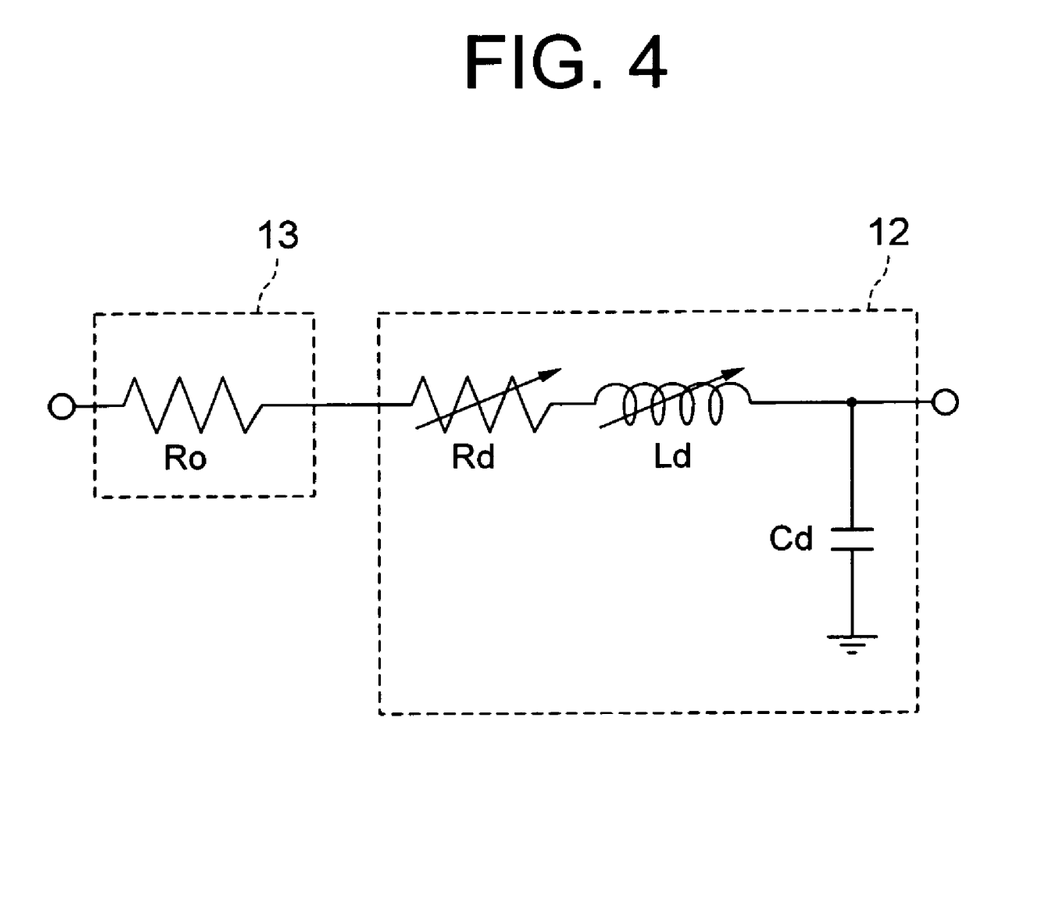
FIG. 4 shows an equivalent circuit of the detecting portion and the externally attached circuit.

Now, the detecting principle of the displacement sensor of the invention is explained. FIG. 4 shows an equivalent circuit of the detecting portion 12 and the externally attached circuit 13 in relation to one fixed core of the fixed cores 21, 22 which are placed so as to be faced each other through the rotor 23. As shown in FIG. 4, the detecting portion 12 is expressed by a circuit comprising a resistance Rd which varies according to the temperature and the displacement of the object to be measured, an inductance Ld, and a condenser Cd. The externally attached circuit 13 is formed by using a resistance R0 connected in series to the detecting portion 12. More specifically, in FIG. 4, the externally attached circuit 13 and the detecting portion 12 are expressed by a LCR circuit comprising the resistance R0, the resistance Rd, the inductance Ld, and the condenser Cd.

Composite impedance of the LCR series circuit in FIG. 4 is expressed by the following equation (1):

$$Z = R_d + R_o + j(\omega L_d - 1/\omega C_d) \quad (1)$$

where $\omega$ is an angular frequency.

Figure 5:
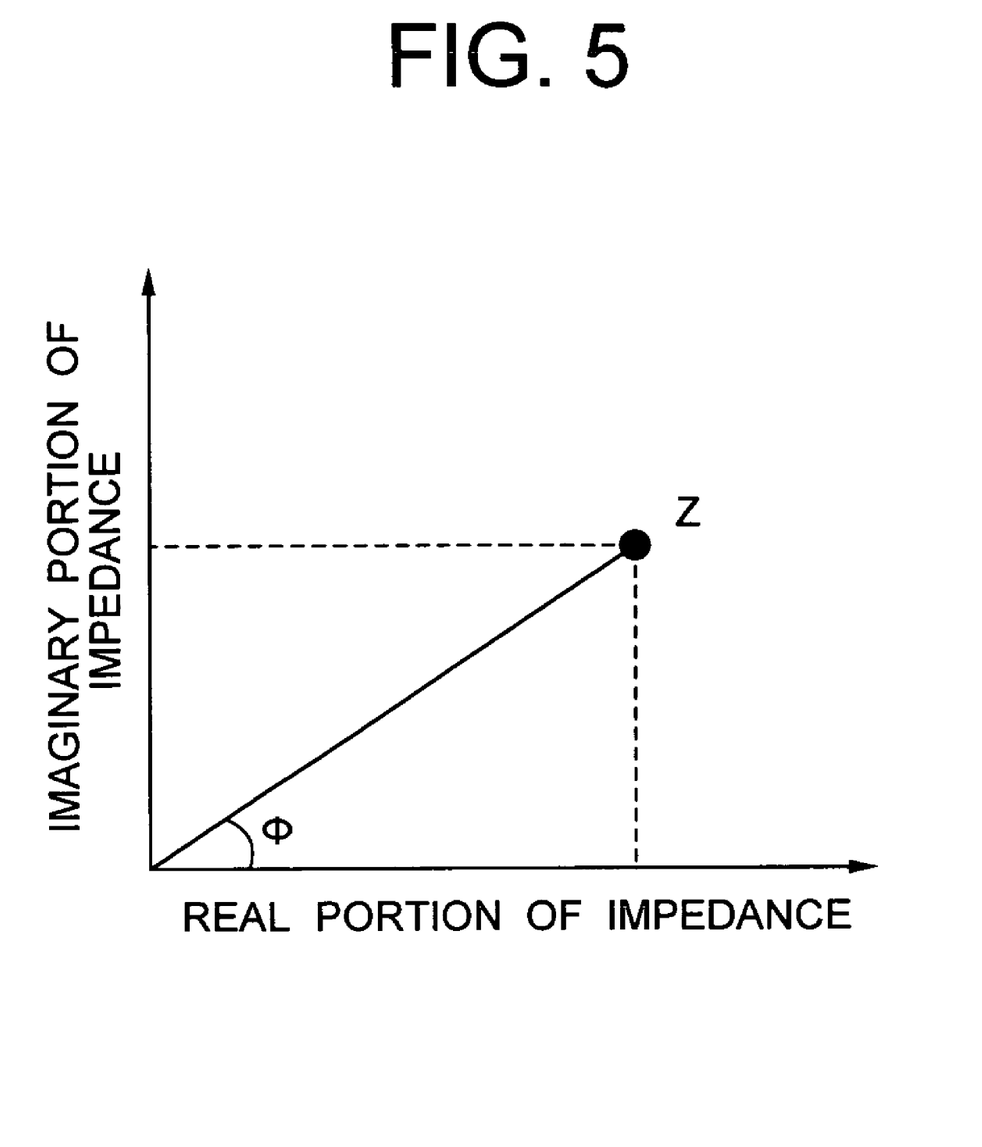
FIG. 5 shows the impedance Z expressed by the equation (1) in a complex plane (Z plane)

FIG. 5 shows the impedance Z expressed by the equation (1) in a complex plane (Z plane). In FIG. 5, the lateral axis corresponds to a real portion of the impedance Z, while the vertical axis corresponds to an imaginary portion of the impedance Z. As is clear from the equation (1), the impedance corresponds to a point (Rd+R0, $\omega$Ld−1/$\omega$Cd) on the plane in FIG. 5, and this point is called as an operating point.

The angle $\phi$ in FIG. 5 corresponds to a phase $\phi$ which is an object to be detected in the LCR circuit in FIG. 4, and exactly corresponds to a sensor output from the displacement sensor (i.e., one to one correspondence). The phase $\phi$ is expressed by the following equation (2):

$$\phi = \tan^{-1}\left(\frac{\omega L_d - 1/\omega C_d}{R_d + R_0}\right) \quad (2)$$

Since the resister Rd and the inductance Ld in the detecting portion vary depending on both of the displacement of the object to be detected and the temperature, the phase $\phi$ is considered to be a function of the position x of the object to be detected and the temperature T, thus is expressed by $\phi=\phi(x, T)$ hereunder.

Figure 6:
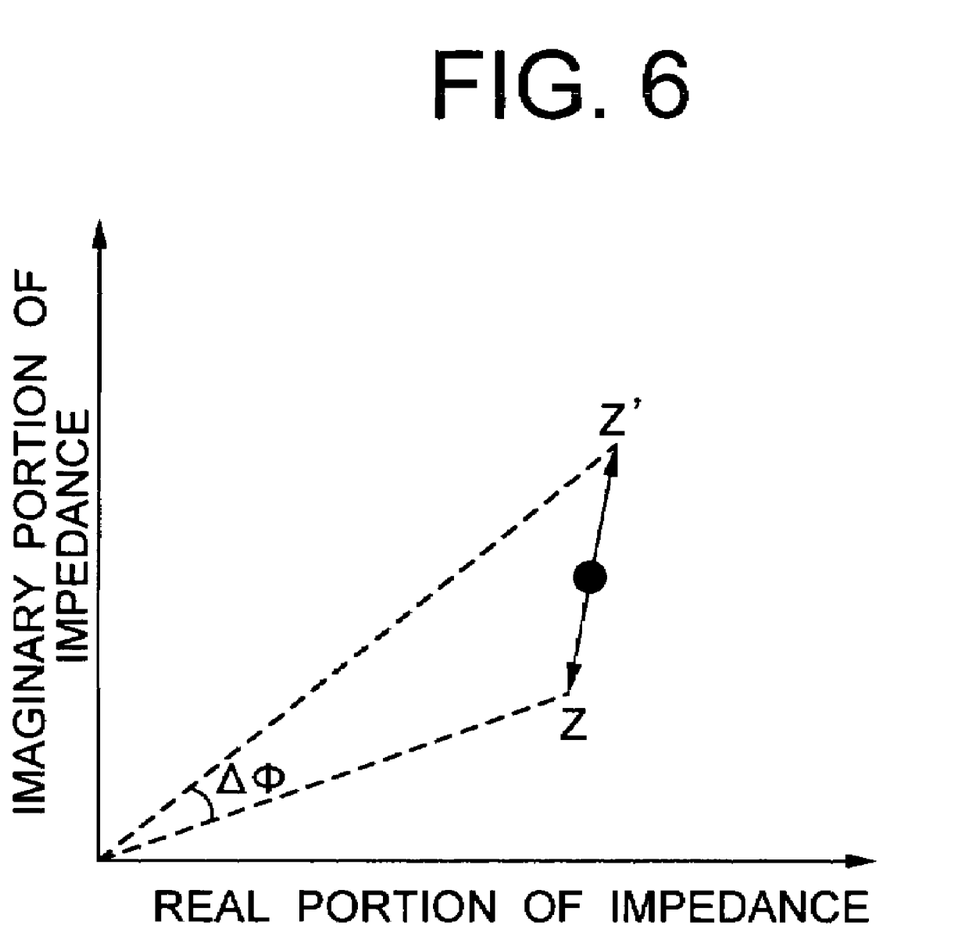
FIG. 6 shows variation of the phase ϕ when the variation factor of the impedance is considered.

FIG. 6 shows variation of the phase $\phi$ when the variation factor of the impedance Z is considered. In FIG. 6, it is shown that the impedance varies within a range from z to z' in correspondence to the variations of the position x and the temperature T. Although the operating point of the impedance is shown as one point in FIG. 5, practically, the operating point varies within a prescribed range as shown in FIG. 6. Thus, the phase $\phi$ as expressed by the equation (2) varies within the variation range of the phase. Accordingly, an amount of phase variation $\Delta\phi$ of the phase corresponding to the prescribed range in FIG. 6 can be recognized.

Figure 7:
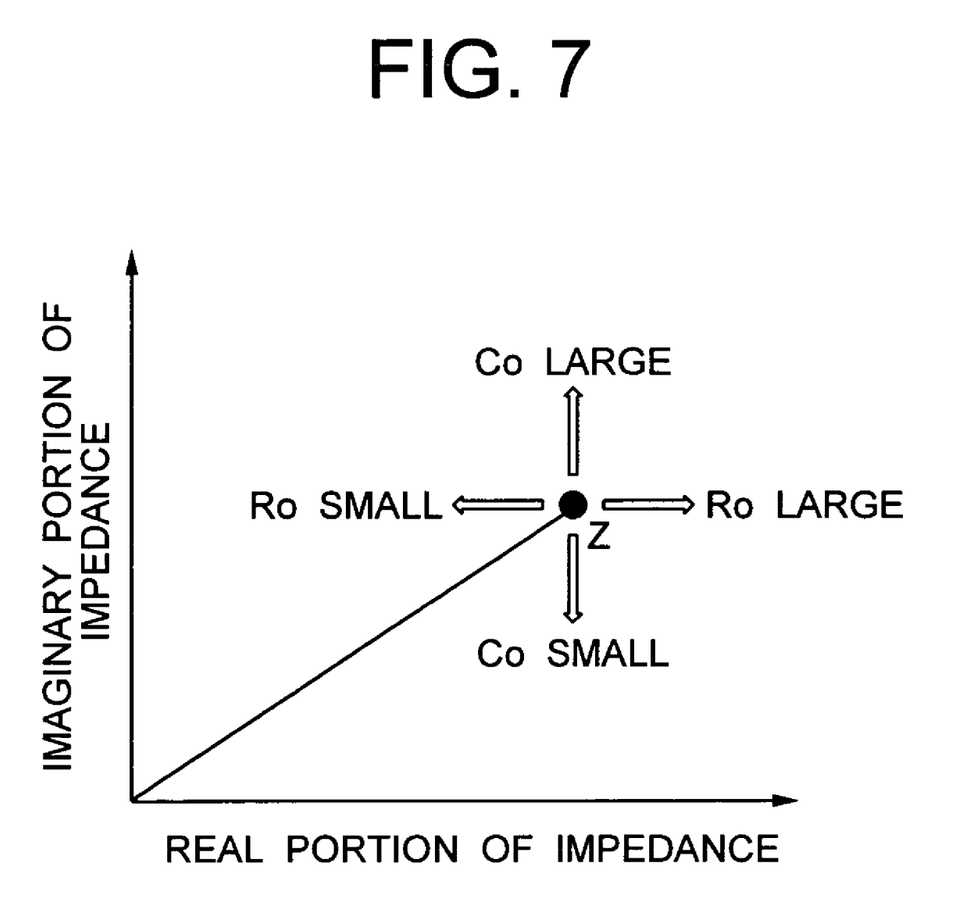
FIG. 7 shows variation of the impedance in accordance with the adjustment of the resistance $R_0$ of the externally attached circuit in a prescribed operating point.

FIG. 7 shows variation of the impedance in accordance with the adjustment of the resistance $R_0$ of the externally attached circuit 13 in a prescribed operating point. In the detecting portion 12, there is no room to adjust the impedance, since the resistance Rd and the inductance Ld are decided according to the structure of the detecting portion. Thus, the case in which the impedance is adjusted by the resister R0 in the externally attached circuit 13 is considered. As shown in FIG. 7, the real portion of the impedance can be adjusted on the bases of the resistance R0 in the externally attached circuit 13. Therefore, the impedance Z can be moved in parallel within the z plane by setting the resistance R0.

In the embodiment, the temperature dependency of the detecting portion 12 is compensated by appropriately setting the resistance R0 of the externally attached circuit 13 as a parameter. More specifically, the parameter is set to satisfy the following equation:

$$\Delta\phi_T < \Delta\phi_S \quad (3)$$

where an amount of phase variation in corresponding to the temperature variation is expressed by $\Delta\phi_T$, an amount of phase variation in corresponding to the displacement is expressed by $\Delta\phi_S$, in connection with the variation of the phase $\phi$.

Figure 8:
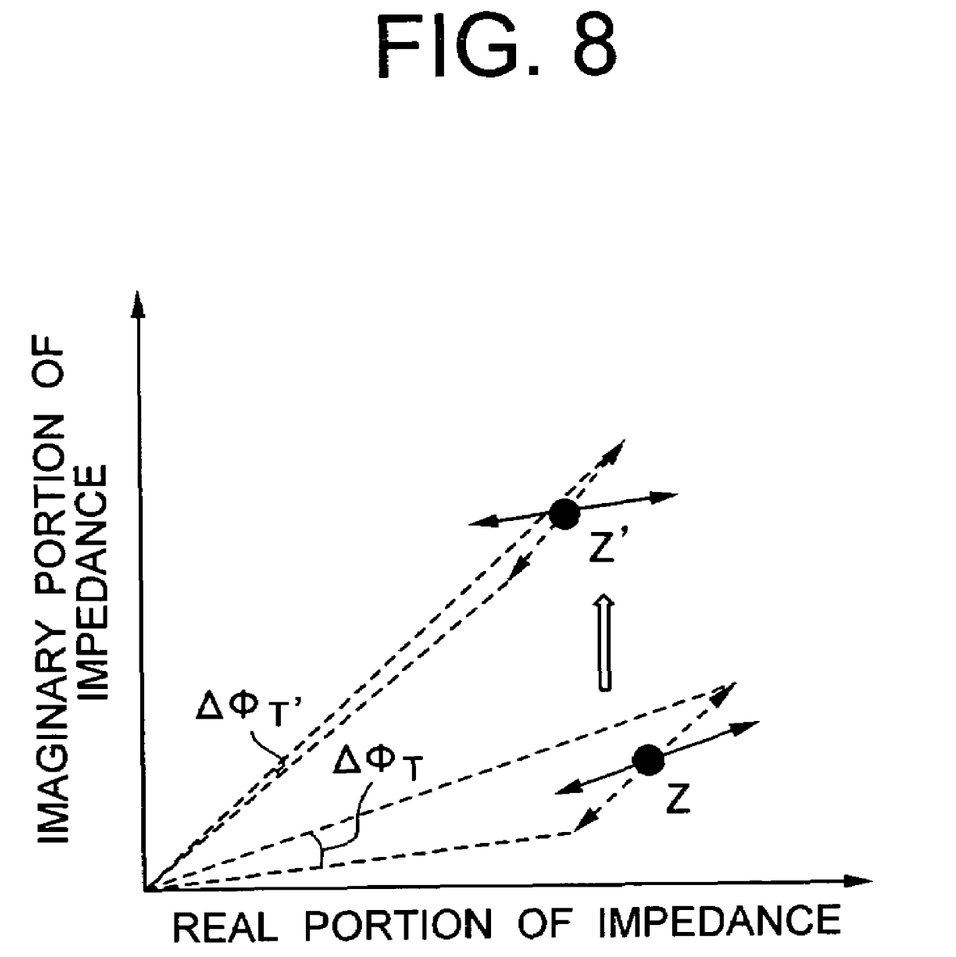
FIG. 8 explains the situation to satisfy the condition expressed by the equation (3) in the Z plane.

FIG. 8 explains the situation to satisfy the condition expressed by the equation (3) in the Z plane. In FIG. 8, operating points (impedance Z, Z') corresponding to two different parameters in relation to the externally attached circuit 12 are depicted. The variation range by the position x (shown by solid arrow line) and the variation range by the temperature T (shown by dotted arrow line) are respectively depicted. Furthermore, as the variation of the phase by the temperature T, there are respectively shown an amount of the phase variation $\Delta\phi_T$ in the position of the impedance Z, as well as an amount of the phase variation $\Delta\phi_T$ in the position of the impedance Z'.

In the case shown in FIG. 8, it is understood that the equation (3) is not satisfied in the position of the impedance Z, while the equation (3) is satisfied in the position of the impedance Z'. As a result, for setting up the parameter of the externally attached circuit 13, the position of the impedance Z is not appropriate because the detecting error affected by the temperature variation becomes large therein, whereas the position of the impedance Z' is preferable because the effect of the temperature variation can be suppressed therein.

It is expressed that a standard temperature is T0 which is the standard of the temperature, a standard position is X0 which is the standard of the position, a variation range of the temperature T is from T1 to T2, and a variation range of the position x is from x1 to x2. The amount of the phase variation $\Delta\phi_T$ in the variation range from T1 to T2 of the temperature in the equation (3) is expressed by the following equation (4) using the above-mentioned $\phi(x, T)$:

$$\Delta\phi_T = |\phi(x_0, T_1) - \phi(x_0, T_2)| \qquad (4)$$

In addition, the amount of the phase variation $\Delta\phi_S$ in the variation range from x1 to x2 of the position in the equation (3) is expressed by the following equation (5) using the above-mentioned $\phi(x, T)$:

$$\Delta\phi_S = |\phi(x_1, T_0) - \phi(x_2, T_0)| \qquad (5)$$

The condition expressed by the following equation (6) is introduced by replacing the equation (3) based on the equations (4) and (5):

$$|\phi(x_0, T_1) - \phi(x_0, T_2)| < |\phi(x_1, T_0) - \phi(x_2, T_0)| \qquad (6)$$

More specifically, it is necessary that the parameter in the externally attached circuit 13 is set up to satisfy the equation (6). Accordingly, a sensitivity to the displacement may be arranged to become larger than a sensitivity to the temperature in at least the detecting characteristics of the displacement sensor.

The condition corresponding to the equation (6) is introduced when expressing directly using the resistance Rd and the inductance Ld of the detecting portion 12. The resistance Rd and the inductance Ld of the detecting portion 12 in relation to the position x and the temperature T are expressed respectively as Rd=Rd (x, T), Ld=Ld (x, T). As the resister R0 of the externally attached circuit 13, an element having a level of temperature dependency which can be ignored in comparison with the detecting portion 12 may be used. In this case, the phase $\phi(x, T)$ may be expressed using the above-mentioned equation (2) as the following equation (7):

$$\phi(x, T) = \tan^{-1}\left(\frac{\omega L_d(x, T) - 1/\omega C_d}{R_d(x, T) + R_0}\right) \qquad (7)$$

Accordingly, the following equation (8) may be introduced based on the equations (4), (5) (6) and (7):

$$\left|\tan^{-1}\left(\frac{\omega L_d(x_0, T_1) - 1/\omega C_d}{R_d(x_0, T_1)}\right) - \tan^{-1}\left(\frac{\omega L_d(x_0, T_2) - 1/\omega C_d}{R_d(x_0, T_2)}\right)\right| < \\ \left|\tan^{-1}\left(\frac{\omega L_d(x_1, T_0) - 1/\omega C_d}{R_d(x_1, T_0)}\right) - \tan^{-1}\left(\frac{\omega L_d(x_2, T_0) - 1/\omega C_d}{R_d(x_2, T_0)}\right)\right| \qquad (8)$$

The condition expressed by the equation (6) or (8) corresponds to a minimum level of condition required as the displacement sensor in which the sensitivity to the displacement in one measuring point is above the sensitivity to the temperature. Furthermore, the best condition required as the displacement sensor may be expressed by the following equation (9) in one measuring point within a region in the equation (3):

$$\tan^{-1}((\omega L_d(x, T_1) - 1/\omega b C_d)/(R_d(x, T_1) + R_0)) = |(\omega L_d(x, T_1) - \omega L_d(x, T_2))/(R_d(x, T_1) - R_d(x, T_2))| \qquad (9)$$

When the parameter in the externally attached circuit 13 is set to satisfy the equation (9), the output variation due to the temperature in the sensor output from the displacement sensor may be lowered to the level which can be ignored.

The displacement sensor of the present invention may be applied not only to the rotational sensor but also a sensor detecting movement along a straight line. For example, a sensor detecting movement along a straight line is described with reference to FIGS. 9 to 13. The displacement sensor 34 is a sensor detecting an amount of movement of the object along the straight line.

Figure 9:
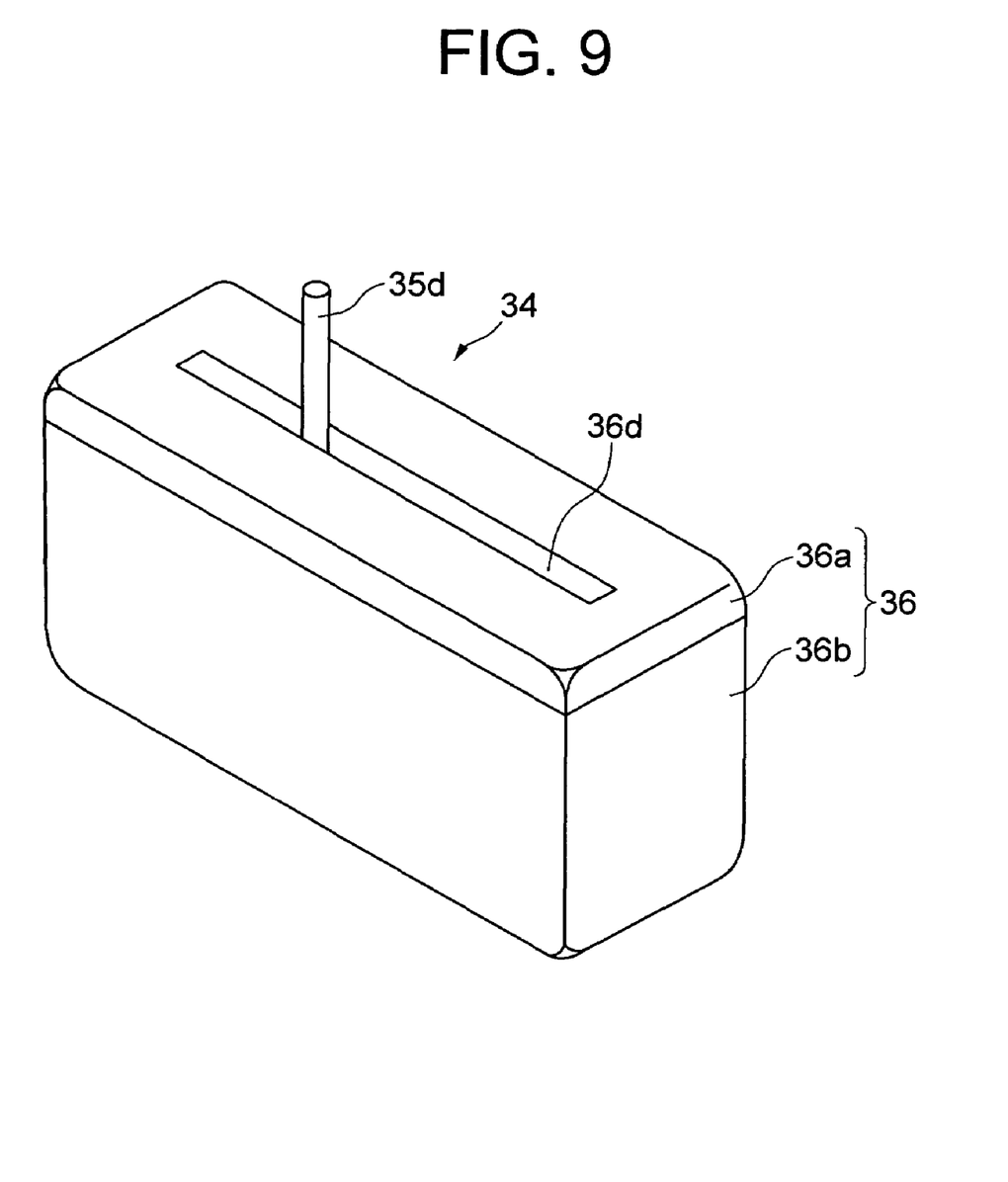
FIG. 9 is a schematic view of the displacement sensor to detect the movement in the direction along the straight line.

FIG. 9 is a schematic whole view of the displacement sensor 34. In the displacement sensor 34, a moving element 35d is attached to a member of a seat in the automobile for example or the like, which is movably arranged in a direction along the straight line to detect an amount of the movement of the member in the longitudinal direction.

Figure 10:
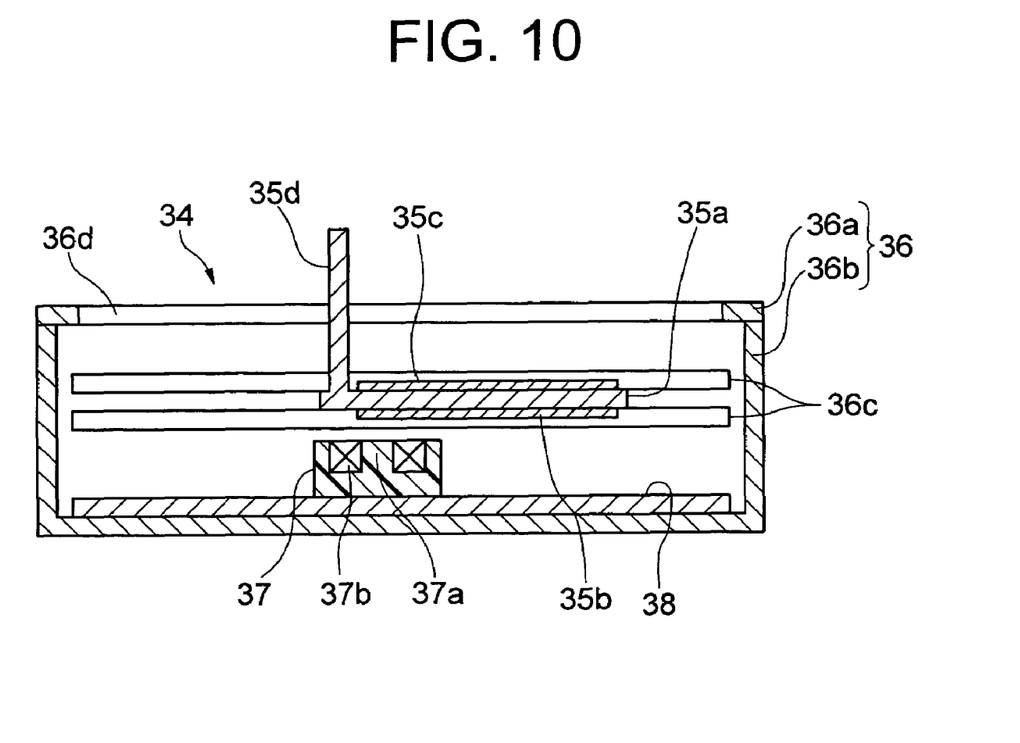
FIG. 10 is a schematic cross sectional view of the displacement sensor depicted in FIG. 9.
Figure 11:
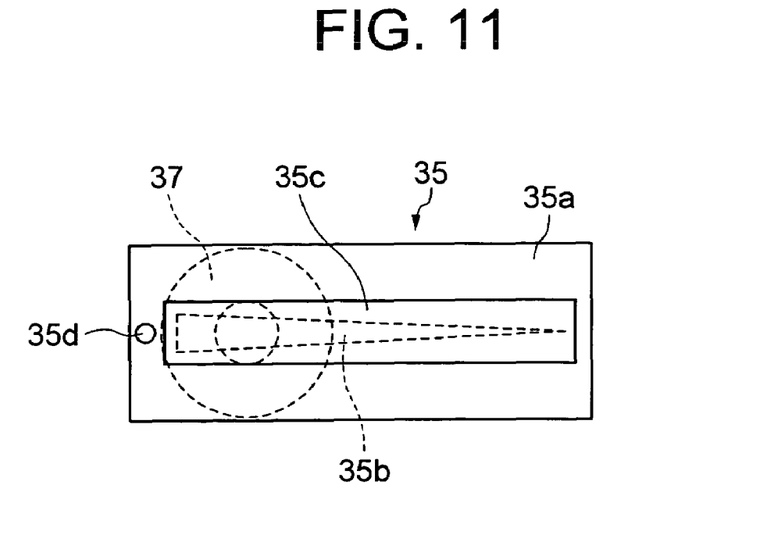
FIG. 11 shows a moving body of the displacement sensor depicted in FIG. 9.

FIG. 10 is a schematic cross sectional view of the displacement sensor 34 depicted in FIG. 9. The displacement sensor 34 includes a moving body 35, a coil core 37 and a measuring device 38 which are received within the case 36. The moving body 35 comprises a moving plate 35a, a sensing plate 35b, a magnetic plate 35c, and a moving element 35d, as shown in FIGS. 10 and 11. The moving element 35d is fixed to a seat in the automobile for example.

The moving plate 35a is made of synthetic resin or the like, and formed to be a plate member. The moving plate 35a is fixed to the moving member which is an object to be sensed. A bar-like moving element 35d is arranged in the end portion of the moving member to move together therewith.

As shown in FIG. 11, the sensing plate 35b is a thin plate made of conductive material (for example, copper, silver, aluminum, brass or the like), and fixed to one face of the moving plate 35a by adhesive agent or the like. The sensing plate 35b is formed to vary the width thereof along the longitudinal direction of the moving plate 35a in corresponding to an amount of the movement of the moving body 35. An eddy current is induced in the sensing plate 35b by an alternating current described later, the magnitude of which corresponds to the amount of the movement.

The magnetic plate 35c is a rectangle thin plate of magnetic substance and has a sectional area larger than the face of the sensing plate 35b which is fixed to the moving plate 35a so as to cover all the face thereof. The magnetic plate 35c is arranged to totally face the moving plate 35a through the sensing plate 35b, and to be fixed on the other face of the moving plate 35a by adhesive agent so as not to spread over the face. The shape of the magnetic plate 35c is not limited to a rectangle and may be any shape, as far as the magnetic plate is arranged to totally face the moving plate 35a through the sensing plate 35b.

The coil core 37 comprises an exciting coil 37b forming a magnetic circuit through which a current excited by alternating current is flowed, and a core 37 holding the exciting coil 37b, as shown in FIGS. 9 and 10. The coil core 37 is arranged so that the upper face thereof faces the sensing plate 37b, and the lower face thereof is fixed to the measuring device 38.

The core 37a is made of insulating magnetic material and is formed to be cylindrical. The core 37a has a ring shaped hollow space at the upper side thereof to receive the exciting coil 37b.

The exciting coil 37b is formed by winding enameled wire for example, and received and held in the hollow space in the core 37a to face the sensing plate 35b.

The exciting coil 37b is electrically connected to the measuring device 38 and the current excited by the alternating current is flowed thereto. When the current excited by the alternating current is flowed in the exciting coil 37b, alternating current magnetic field is formed around the exciting coil 37b so as to form a magnetic circuit Cmg.

The case 36 comprises a plate-shaped upper case 36a in which a long rectangular hole 36d is formed in a center portion thereof along a longitudinal direction into which the moving element 35d is inserted, and a lower case 36b including a bottom portion and four wall portions each portion comprising rectangular plate of the same height, in the lower case of which a pair of holding portions 36c holding the moving body 35 with a prescribed clearance are formed facing each other inside of the wall portions. The upper and lower cases 36a, 36b are made of synthetic resin or conductive material.

The upper case 36a and the lower case 36b are engaged to form the case 36, and the moving body 35, the coil core 37 and the measuring device 38 are received and arranged within the hollow space formed by the upper case 36a and the lower case 36b.

As shown in FIG. 11, the substrate with the measuring device arranged is fixed to the upper face of the bottom plate portion of the lower case 36b. The moving body 35 is arranged in the case 36 in such manner that the sensing plate 35b faces the bottom plate portion of the lower case 36b, and long end portions of the moving body 35a are movably held on the holding portion 36c. The coil core 37 is fixed to the upper face side of the substrate of the measuring device 38 in such manner that the exciting coil 37b is arranged to face the sensing plate 35b with a several mm space therebetween. The case 36 is formed by engaging the upper case 36a and the lower case 36b with the moving element 35d inserted into the long rectangular hole 36d. The case 36 is arranged so as to be fixed to the fixing member (not shown).

The measuring device 38 comprises a substrate with a circuit formed therein. The measuring device is connected to a power source or a wire harness for transmitting signal through a connector (not shown) installed on a plurality of cables extended outside from the case 36. In addition, the measuring device is electrically connected to external devices provided outside the case 36. In the measuring device 38, the externally attached circuit 38c, a phase shift portion 38d, a detecting portion for phase shift amount 38e, a converter 38f and an amplifying circuit 38g are connected between a frequency dividing circuit 38b and a measuring portion 38h, as depicted in FIG. 12.

Figure 12:
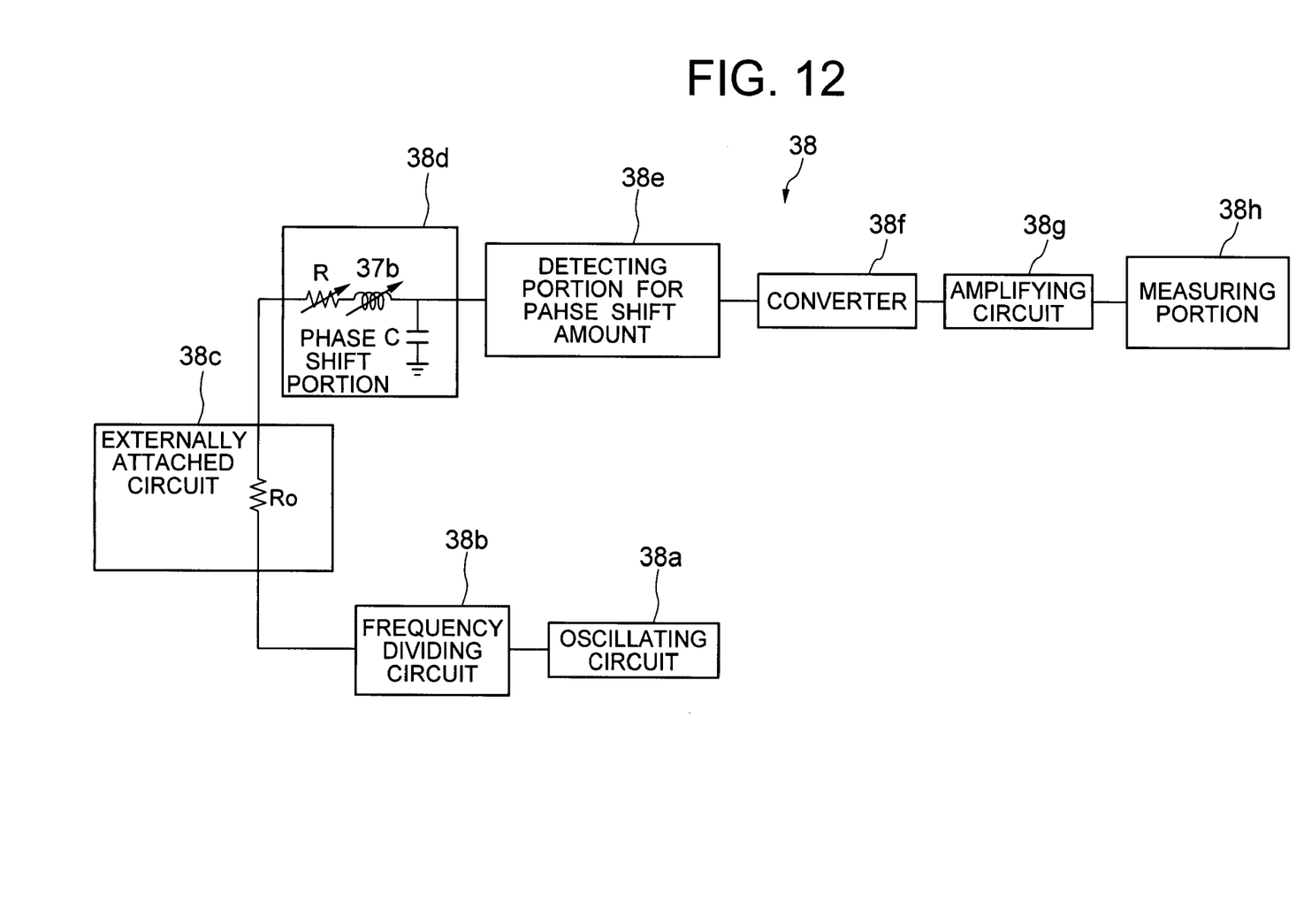
FIG. 12 explains a measuring device using the displacement sensor.

The oscillating circuit 38a outputs oscillating signal having a prescribed frequency to the phase shift portion 38d comprising the resistor R, the exciting coil 37b and condenser C as shown in FIG. 12 through the frequency dividing circuit 38b and the resister R0 in the externally attached circuit 38c. Then, the phase of the voltage signal between both ends of the condenser C varies according to the variation of the impedance in the exciting coil 37b. The voltage signal between both ends of the condenser C is output to the detecting portion for phase shift amount 38e. In this embodiment, the phase shift portion 38d and the detecting portion for phase shift amount 38e correspond to the detecting portion.

The detecting portion for phase shift amount 38e detects an amount of the phase shift in the voltage signal between both ends of the condenser C. The converter 38f converts the detected amount of the phase shift to the corresponding voltage value. In the displacement sensor 34, for example, the output signal Sc from the converter 38f is amplified by the amplifying circuit 38g and input into the measuring portion 38h employing one chip micro processor, as shown in FIG. 12. The measuring portion 38h reads the voltage value of the output signal Sc, then implements appropriate signal processing, and detects an amount of the movement of the moving body 35 as described later.

Figure 13:
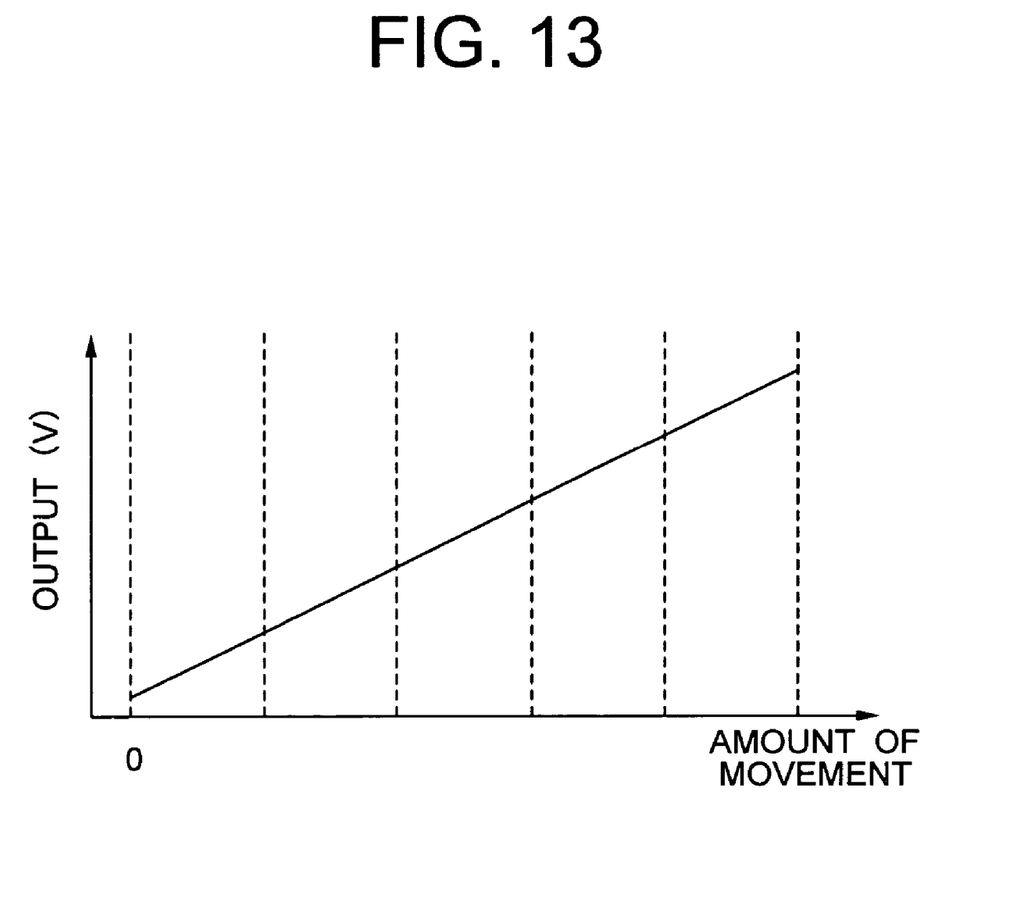
FIG. 13 shows output characteristics of the output signal of the exciting coil in the displacement sensor and a moving signal output from the measuring portion of the measuring device.

In the above-mentioned displacement sensor 34, when the current excited by the alternating current is flowed to the exciting coil 37b, the alternating current magnetic field is formed around the exciting coil 37b so that the magnetic circuit Cmg is formed by the combined core 37a and magnetic plate 35c. The magnetic circuit Cmg is formed to pass the magnetic plate 35c through the sensing plate 35b, and the magnetic flux from the core 37a cuts across the sensing plate 35b and passes the magnetic plate 35c. When the magnetic flux cuts across the sensing plate 35b, the eddy current is induced on the surface of the sensing plate 35b to vary the impedance in the exciting coil 37b. The amount of variation of the impedance varies in corresponding to the amount of the eddy current induced on the surface of the sensing plate 35b. The amount of the eddy current induced on the surface of the sensing plate 35b varies in corresponding to the area of the portion of the sensing plate 35b which faces the coil core 37. Accordingly, when the moving body 35 moves along the longitudinal direction, the width of the sensing plate 35b in the moving body facing the coil core 37 varies in proportion to the amount of movement of the moving body 35. Together with the above-mentioned variation, the area of the portion of the sensing plate 35b facing the coil core varies. As a result, the impedance in the exciting coil 37b varies, and then the measuring device 38 detects the variation to transform into the moving signal of the moving body 35. Thus, as shown in FIG. 13, the amount of the movement in the seat or the like to which the moving body 35 is attached and fixed is detected.

When a vibration is applied to the displacement sensor 34 by means of arranging the displacement sensor 34 so as to be placed on the portion to which the vibration is applied such as automobile, the space between the coil core 37 and the moving body 35 varies within a scope of a clearance, since the moving body 35 is held by the holding portion 36c with a prescribed clearance. Thus, the effect given to the magnetic flux of the sensing plate 35b varies, and accordingly, the effect given to the impedance in the exciting coil 37b of the sensing plate 35b varies. Furthermore, since the magnetic plate 35c is installed on the other face of the moving plate 35a, the effect given to the magnetic flux in the magnetic plate 35c varies, and accordingly, the effect given to the impedance in the exciting coil 37b of the magnetic plate 35c varies. Since the sensing plate 35b and the magnetic plate 35c are installed integrally with the moving plate 35a, the respective amounts of the variation of the space between the exciting coil 37b and the sensing plate 35b, as well as between the exciting coil 37b and the magnetic plate 35c are the same. Materially, the sensing plate 35b has a property causing the magnetic flux hard to pass therethrough, whereas the magnetic plate 35c has a property causing the magnetic flux easy to pass therethrough. The respective effect given to the magnetic flux are opposite each other. Accordingly, the respective effect of the sensing plate 35b and the magnetic plate 35c given to the impedance of each exciting coil 37b are opposite. Thus, the effect of both of the sensing plate 35b and the magnetic plate 35c given to the impedance of the exciting coil 37b are offset. The detecting error of the displacement sensor 34 due to the vibration or the like is therefore reduced. Furthermore, it is not necessary to install two coil cores 37 so as to face each other, and the height of the case can be lowered to downsize the displacement sensor 34, thus lowering the cost. In case that the displacement sensor 34 of the invention is installed at the location where there is no concern for vibration, the magnetic plate 35c may not be installed.

As described in detail, according to the displacement sensor of the invention, even if the coil 37b employed in the detecting portion (i.e., phase shift portion 38*d* and the detecting portion for phase shift amount 38*e*) has temperature dependency, the temperature dependency may be compensated by the appropriate setting of the parameter in the externally attached circuit 38*c*. As a result, when the displacement sensor is used under various conditions, the output variation due to the temperature variation may be suppressed to improve reliability. For example, when the present invention is employed as the displacement sensor such as the rotational sensor mounted in the automobile, the temperature range to be used becomes remarkably wide. Since the temperature dependency is compensated, it is expected to realize magnificent effect.

What is claimed is:

1. A displacement sensor comprising:
    a detecting portion including a coil arranged in such manner that a relative position to a magnetic response substance varies in correspondence to a displacement of an object to be measured;
    an oscillating circuit to supply an alternating-current signal with a prescribed frequency to said detecting portion;
    an externally attached circuit connected to said detecting portion; and
    a displacement detecting means to detect said displacement of the object to be measured based on an amount of phase variation of an impedance in said detecting portion and said externally attached circuit, wherein parameters of said externally attached circuit are set in such manner that the amount of the phase variation by the displacement becomes larger than the amount of the phase variation by temperature variation.

2. The displacement sensor as claimed in claim 1, wherein said parameters of said externally attached circuit are set to satisfy a following equation:

$$|\phi(x_0,T_1)-\phi(x_0,T_2)|<|\phi(x_1,T_0)-\phi(x_2,T_0)|$$

where $T_0$ is a standard temperature which becomes standard for a temperature, $x_0$ is standard position which becomes standard for a position of said object to be detected, variation region of the temperature is from $T_1$ to $T_2$, variation region of the position is from x1 to x2, and said phase is expressed by a function $\phi(x, T)$ of the position x and the temperature T.

3. The displacement sensor as claimed in claim 1, wherein said parameters of said externally attached circuit are set to satisfy a following equation:

$$\tan^{-1}((\omega L_d(x,T_1)-1/\omega bC_d)/(R_d(x,T_1)+R_0))=|(\omega L_d(x,T_1)-\omega L_d(x,T_2))/(R_d(x,T_1)-R_d(x,T_2))|$$

where $R_0$ is a resistance of said externally attached circuit, $C_0$ is a condenser, variation region of temperature T is from $T_1$ to $T_2$, and the resistance $R_d$ and inductance $L_d$ of said detecting portion are expressed respectively as $R_d=R_d(x, T)$, $L_d=L_d(x, T)$.

4. The displacement sensor as claimed in claim 1, wherein said displacement sensor comprises a rotating sensor including two fixed cores arranged to face each other with a specific distance therebetween to which exciting coil is integrally attached, respectively, and a rotor of conductive material arranged between said fixed cores and having sensing portion in which a width in an diameter direction varies in correspondence to an angle of rotation.

5. The displacement sensor as claimed in claim 2, wherein said displacement sensor comprises a rotating sensor including two fixed cores arranged to face each other with a specific distance therebetween to which exciting coil is integrally attached, respectively, and a rotor of conductive material arranged between said fixed cores and having sensing portion in which a width in an diameter direction varies in correspondence to an angle of rotation.

* * * * *